Apr. 3, 1923.
T. P. LITTLE
TUBE MANUFACTURE
Filed May 1, 1922
1,450,320
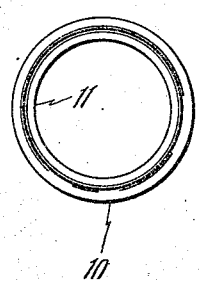
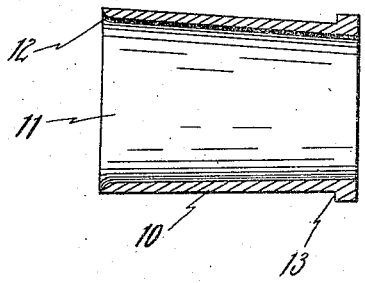
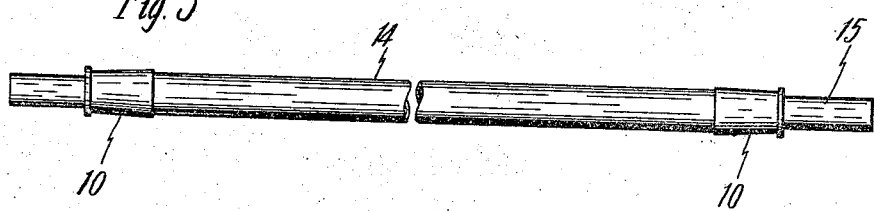
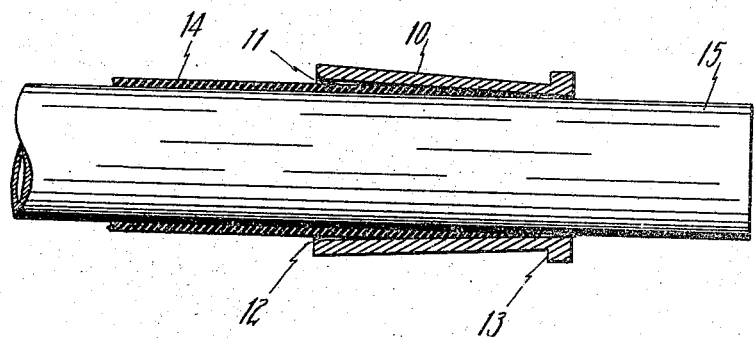
INVENTOR
Thomas P. Little
BY
ATTORNEY Patented Apr. 3, 1923.

1,450,320

UNITED STATES PATENT OFFICE.

THOMAS P. LITTLE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TUBE MANUFACTURE.

Application filed May 1, 1922. Serial No. 557,511.

*To all whom it may concern:*

Be it known that I, THOMAS P. LITTLE, a citizen of the United States of America, residing at Chicopee Falls, in the county of Hampden and State of Massachusetts, have invented certain new and useful Improvements in Tube Manufacture, of which the following is a specification.

My present invention relates to the manufacture of rubber tubes, such as inner tubes for pneumatic tire casings, and has particular reference to an improved clamp for sealing and skiving the ends of the tubes. The objects of the invention are the improvement from standpoints of economy, accuracy, and efficiency of the tube building operation and devices, and reside specifically in the various features pointed out more fully below.

My invention will now be described with particular reference to the accompanying drawing, in which—

Fig. 1 is an end view of my improved clamp;

Fig. 2 is a longitudinal median section thereof;

Fig. 3 is a view illustrative of the manner in which the clamp is used in the manufacture of rubber tubes; and Fig. 4 is a view, partly in longitudinal median section, illustrative of the action of the clamp in use upon a tube.

In the vulcanization of rubber tubes upon mandrels, it has been proposed to do away with the customary spiral wrapping of fabric by using a suitable metal clamp which serves to press the ends of the tube against the mandrel, sealing the tube ends so that air or steam cannot penetrate between the tube and mandrel, and in some instances skiving the end of the tube so as to obviate the necessity of this being done as a later operation preliminary to splicing the tube into annular form. By my present invention, a simpler, more reliable, and more uniformly effective clamp is provided than with earlier devices, and the method of vulcanizing the tube is improved.

The clamp of my invention is simple in construction; comprising a shell 10 having a tapered bore 11, preferably curved at one end as at 12. A flange 13 serves to give a hold on the clamp so that it may readily be removed from the tube. In use a tube 14 of unvulcanized rubber is placed on the mandrel 15 in any suitable way, as by rolling the sheeted rubber stock thereon. The inside of the bore 11, the surface of the ends of the rubber tube, or preferably both, are coated with a preparation such as soap which will permit sliding of the clamp over the rubber and yet will not interfere with vulcanization. A clamp is now placed upon each end of the tube. The soap reduces the friction between the tube and the clamp so much lower than the friction between the tube and the mandrel that when the clamp is forced upon the tube it will slide over the rubber without causing the tube to slide on the mandrel. A convenient manner of forcing the clamp upon the tube is by driving it by sharp blows given by a heavy brass cylinder slipped over the end of the mandrel. The clamp is forced upon the tube to cause the desired degree of sealing and beveling, and the mandrel, with the tube and clamps thereon, placed in a suitable heater and vulcanized. After vulcanization the clamps are removed and the tube stripped from the mandrel. The beveling or skiving resulting from the use of the improved clamp will generally permit the tube ends being spliced together in a lap-joint to form an annular tube without any further preparation.

It will be noticed that the improved clamp gives a surface on the tube without longitudinal or transverse ribs or seams which might form leaks in the splice. The clamp can be used repeatedly, and entirely avoids the use of the rapidly deteriorating fabric or tape customarily used in binding the ends of tubes to the mandrels.

Having thus described my invention, I claim:

1. A clamp for use in vulcanizing rubber tubes upon mandrels, having a tapered seamless bore.

2. A clamp for use in vulcanizing rubber tubes upon mandrels, having a non-extensible tapered bore.

3. A clamp for use in vulcanizing rubber tubes upon mandrels, comprising a rigid member having a tapered bore therethrough, and a flange adapted to assist in the removal of the clamp from the tube.

4. A method of preparing rubber tubes for vulcanization upon mandrels which includes pressing the end of the tube against the mandrel with a sliding member, and treating the tube so that the sliding friction between the tube and mandrel will be greater than that between the tube and the member.

5. A method of preparing rubber tubes for vulcanization upon mandrels which comprises mounting the tube upon a mandrel, coating the outside of the ends of the tube with a lubricant, and pressing the ends of the tube against the mandrel by sliding a tapered member thereon.

6. A method of preparing rubber tubes for vulcanization which includes sliding over the end of the tube a member having a tapered internal bore, the friction between the member and the tube being less than that between the tube and mandrel.

7. A method of preparing rubber tubes for vulcanization which includes sliding over the end of the tube a member having a tapered internal bore, the friction between the member and the tube being less than that between the tube and mandrel, and driving the member firmly upon the tube by sharp blows in the direction of the axis of the tube.

THOMAS P. LITTLE.